May 18, 1937. A. C. HEARD 2,080,401
GEAR CUTTER
Filed April 9, 1935 2 Sheets-Sheet 2

Inventor
August C. Heard
By
B. K. Schlesinger
Attorney

Patented May 18, 1937

2,080,401

UNITED STATES PATENT OFFICE 2,080,401

GEAR CUTTER

August C. Heard, Rochester, N. Y., assignor to Gleason Works, Rochester, N. Y., a corporation of New York Application April 9, 1935, Serial No. 15,417

3 Claims. (Cl. 29—106)

The present invention relates to cutting tools and particularly to gear cutters of the face-mill type for cutting gears in a roughing operation.

The primary object of the present invention is to provide means for supplying coolant more directly and more effectively to the blades or teeth of a cutting tool as they take their cuts.

The present invention is particularly applicable to the cooling of the blades of face-mill cutters of the roughing type. With such methods as have heretofore been employed for supplying coolant to the blades of face-mill roughing cutters, difficulties are experienced, particularly where a heavy feed is employed, that is, where the cutter is fed into the blank at a fast rate, in keeping the blades properly cooled. Due to the thin section of the blades at their tips, the tips of the blades become intensely heated as the blades take their cuts and the chips produced by the cuts tend to adhere to and weld onto the tips of the blades under the intense heat. The intense heat "burns" the blades and when the chips adhere to the blades, they produce a scratchy finish on the tooth surfaces being cut and, moreover, the blades become pitted. The "burning" and "pitting" reduce the length of usefulness of the blades between sharpenings and decrease the total life of the blades.

Through the present invention, the cutter head itself is provided with ducts through which the coolant is directed at the individual blades and especially at their front faces as they pass through the gear blank. Thus, the blades are effectively cooled during the whole of their cut. The front faces and particularly the tips of the blades are bathed in the coolant throughout the whole of the cut and the heat normally generated at the tips of the blades is dissipated and, moreover, the chips produced by the cut are washed away. The present invention operates, therefore, to prolong materially the length of usefulness of the blades between sharpenings and to increase the total life of the blades and, in addition, insures a smoother finish on the sides of the teeth being cut.

Several different modifications of the invention are illustrated in the accompanying drawings in which.

Figure 1:
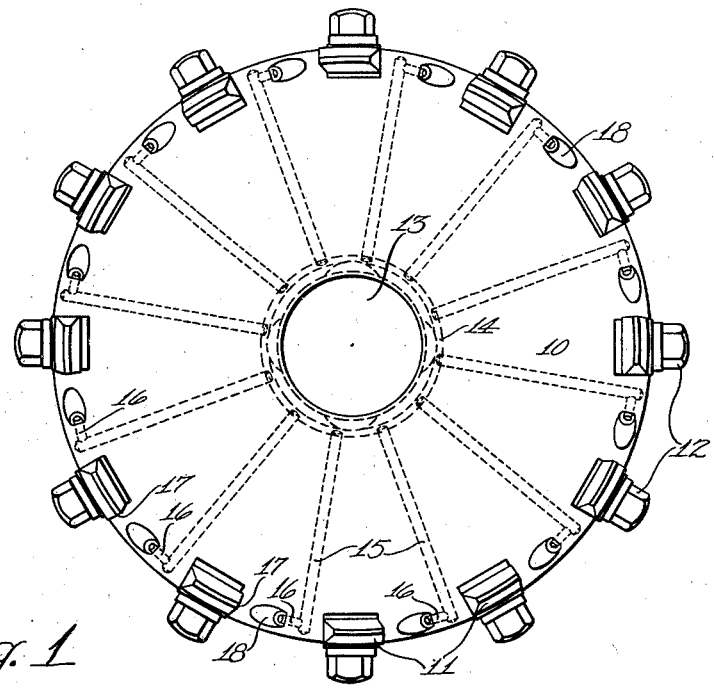
Fig. 1 is a plan view of a face-mill gear cutter constructed according to one embodiment of my invention.
Figure 2:
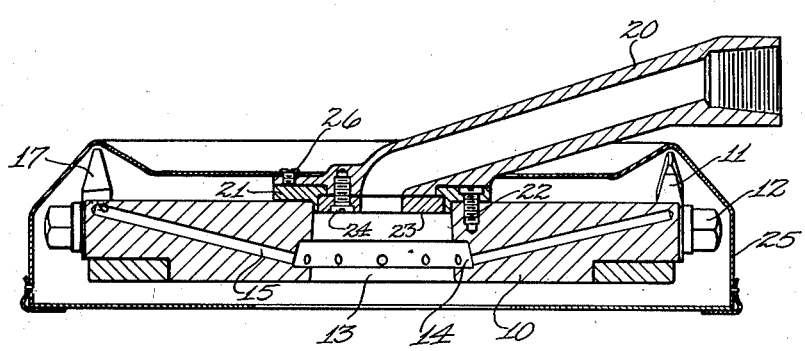
Fig. 2 is a transverse sectional view through the cutter shown in Fig. 1 and showing, in addition, in section a typical guard for this cutter and a connecting pipe for supplying coolant to the cutter.

Referring to the drawings, I have shown in Figs. 1 and 2 a face-mill gear cutter comprising a rotary head 10 and a plurality of annularly arranged cutting blades 11. The cutting blades 11 are secured in slots in the head 10 in the usual manner by bolts 12.

The cutter head 10 is provided with the usual centrally located bore 13 for mounting of the cutter upon the tool spindle of the gear cutting machine. In the case of the present cutter, however, the central bore 13 is formed with a circumferential recess 14, as clearly shown in Fig. 2. The cutter head is drilled to provide a plurality of ducts 15 which communicate with the recess 14. There are the same number of ducts 15 as there are blades in the cutter.

The ducts 15 extend outwardly and forwardly in the cutter head from the recess 14. They communicate with short ducts 16 which extend forwardly from the ducts 15 and open on the forward face of the cutter head at points to direct coolant flowing through the ducts onto the front faces of the cutter blades 11. To assist in directing the coolant at the front faces 17 of the cutter blades and particularly at the tips of these blades, the cutter head is provided with a plurality of elongated recesses 18 which taper in depth from the points where they communicate with the ducts 16 to the forward surfaces of the cutter head.

Coolant may be supplied to the bore 13 of the cutter head and the recess 14 therein through the cutter spindle if desired. In the embodiment illustrated, the coolant is supplied to the bore 13 through a pipe 20. The nozzle-head of the pipe fits into a bushing 21, which is secured by screws 22 in the bore of the cutter head at the forward end thereof. The pipe is secured against axial movement relative to the cutter head by a washer or ring 23 which seats against a flange formed on the bushing 21 and which is secured to the pipe by screws 24.

The coolant pumped through the pipe 20 flows through the ducts 15 and 16 and is directed upwardly at the front faces of the blades so as to bathe the front faces and particularly the tips of the blades in coolant as the blades take their cuts.

Heretofore, the coolant supplied to face-mill gear cutters has been supplied through a nozzle which is mounted upon the machine at a convenient point but which has had no connection with the cutter. As the cutting blades rotate through the gear blank, the angle between the front face of each blade and the stream of coolant changes. Hence, the stream of coolant is not uniformly effective. With the construction of the present invention, however, the stream of coolant is not only projected in a most effective manner onto the blade, that is, at its front face and forwardly toward its tip, but the angle of projection of the stream remains constant throughout the operation of the blade and so the most effective cooling is achieved during the whole time that the blade is taking its cut.

For the purpose of securing the maximum benefit from the coolant, a cutter guard may be employed such as designated at 25 in Fig. 2. This guard may be made of sheet-metal shaped to conform closely, as shown, to the shape of the cutter. It operates to confine the coolant closely in around the cutter blades and therefore to get the maximum benefit from use of the coolant. The guard 25 may be secured to a flange on the pipe 20 by screws 26. The guard has an opening in its rear face to allow it to be inserted over the tool spindle of the cutting machine and also to allow escape of the coolant after use.

Figure 3:
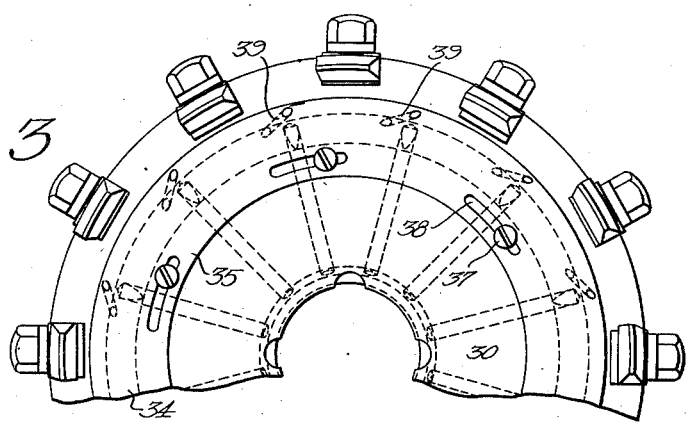
Fig. 3 is a fragmentary plan view and Fig. 4 a transverse section through a modified form of cutter constructed according to this invention.
Figure 4:
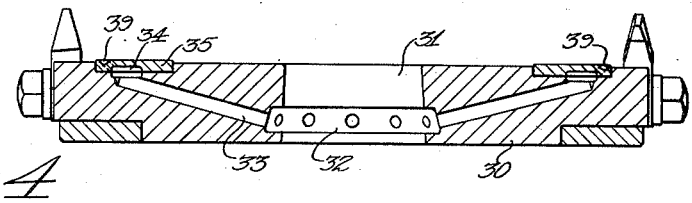

As the cutter blades 11 are sharpened back, there will, of course, be some slight change in angle between the direction of the streams flowing from the ducts 16 and the front faces of the blades. Normally, this slight change of angle would be of no material consequence. However, in some instances it may be desirable to change the direction of the streams of coolant as the blades of the cutter are sharpened back. An embodiment of the invention wherein provision is made for changing the direction of the coolant streams as the blades are sharpened is shown in Figs. 3 and 4.

Here the cutter head 30 has, as before, a central bore 31 and a circumferential recess 32 in this bore. Ducts 33 lead from the recess 32 forwardly and outwardly of the cutter head. They communicate with an annular recess 34 which is formed partly in the cutter head and partly in an annular plate 35. The plate 35 is secured in an annular recess formed in the front face of the cutter head and is rotatably adjustable in this recess. It is secured to the cutter head by bolts 37 which pass through arcuate slots 38 formed in the plate and which thread into the cutter head.

At equi-spaced points the plate 35 is drilled to provide the ducts 39 which communicate with the annular recess 34 and which extend forwardly and outwardly from the recess 34. By adjusting the plate 35 on the cutter head, the ducts 39 can be positioned so as to direct the coolant at the proper angle at the front faces of the blades when the blades are new and by changing the adjustment of the plate 35 after each sharpening, the proper adjustment of the direction of the streams of coolant can be maintained throughout the whole of the useful life of the blades.

Figure 5:
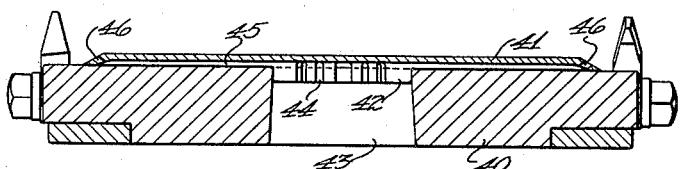
Fig. 5 is a transverse sectional view through a cutter built according to still another modification of this invention.

In the embodiments of the invention shown in Figs. 1 to 4 inclusive, the cutter head is drilled for the ducts through which the coolant is conducted to the blades. The cost of drilling may be avoided by employing the embodiment of my invention illustrated in Fig. 5. Here a coolant-distributor plate 41 is used. This is secured to the front face of the cutter head 40 in any suitable manner. The plate 41 is formed with a central flange 42 which seats in the bore 43 of the cutter head. There are grooves 44 formed in the flange 42, and these communicate with ducts 45 also formed in the plate 41.

There are as many ducts 45 as there are blades in the cutter and the ducts 45 communicate with the openings 46 which direct the coolant onto the front faces of the blades.

As in the previously described embodiments of my invention, the coolant is supplied to the bore of the cutter head and then distributed through the grooves 44, ducts 45 and openings 46 to the blades. In the embodiment shown in Fig. 5, the front face of the cutter head forms one side wall of the ducts 45, but the ducts 45 may be wholly formed in the plate 41 if desired. The plate 41 may be rotatably adjusted on the cutter head to direct the coolant always at the same angle upon the front faces of the blades despite repeated sharpenings of the blades.

Figure 6:
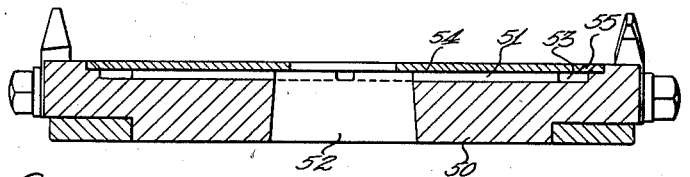
Fig. 6 is a transverse sectional view of a cutter constructed according to a still further modification of the invention.

In the embodiment of the invention illustrated in Fig. 6, the front face of the cutter head 50 is formed with shallow radial grooves 51 which communicate at one end with the bore 52 of the cutter head and at the other end with the annular grooves 53 formed in the front face of the cutter head. The grooves 51 and the recess 53 are covered by a cover-plate 54 which is secured in any suitable manner to the cutter head. This cover-plate is provided with a plurality of spaced ducts 55, one for each blade in the cutter. The ducts 55 extend forwardly and outwardly from the groove 53 to direct streams of coolant upon the front faces of the cutter blades. If desired, the plate 54 may be mounted on the cutter head 50 for rotatable adjustment for the purpose of directing streams of coolant always at the same angle upon the front faces of the blades throughout the useful life of the blades.

In the embodiment of the invention described, it has been assumed that coolant will be supplied to the bore of the cutter head and conducted thence through the means described to the cutter blades. It will be obvious, however, that coolant may be supplied to the cutter head in various other ways. Thus it may be supplied through a pipe registering either with the front face or with the back face or with the periphery of the cutter head and supplying coolant to the several ducts in the head only when these ducts register with the pipe in the course of rotation of the head.

Other embodiments of the invention will suggest themselves to those skilled in the art. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. In combination, a face-mill gear cutter comprising a rotary head and a plurality of circularly arranged cutting blades which project beyond one side face of the head in the general direction of the axis of the head, said head having a central bore and a plurality of radial grooves in its front face communicating with the central bore, and a plate covering said grooves and having a plurality of ducts formed therein to communicate with said grooves and conduct coolant from said grooves to points spaced from the blades and direct the same onto the cutter blades and angularly toward their tips.

2. A face-mill gear cutter comprising a rotary head and a plurality of circularly arranged cutting blades which project beyond one side face of the head in the general direction of the axis of the head, said head having a central bore and having a plurality of shallow depressions formed in said side face, respectively, one for each cutting blade and spaced from the front face of each blade, and said head having ducts formed therein to connect said bore with said depressions, said depressions being so formed as to direct coolant at the front faces of the blades and angularly toward their tips.

3. The combination with a face-mill gear cutter comprising a rotary head and a plurality of circularly arranged cutting blades, which project beyond one side face of the head in the general direction of the axis of the head, said head having a central bore, of a plate mounted on said head for rotatable adjustment thereon, said plate having a plurality of ducts communicating with said bore to conduct coolant from said bore to points spaced from said blades and means on said plate at the discharge end of said ducts adapted to direct the streams of coolant flowing from said ducts at the several cutting blades, said plate being rotatably adjustable on the head to maintain the distance of the discharge ends of the ducts from said blades uniform.

AUGUST C. HEARD.